United States Patent Office 3,833,513
Patented Sept. 3, 1974

3,833,513
CORROSION INHIBITING GEL FOR ELECTRICAL CONNECTORS
Joseph Fath, Princeton, N.J., assignor to Tenneco Chemicals Inc.
No Drawing. Filed Feb. 7, 1972, Ser. No. 224,308
Int. Cl. C23f 11/10
U.S. Cl. 252—389 R          7 Claims

ABSTRACT OF THE DISCLOSURE

This invention provides a metal corrosion protection medium especially designed and adapted for electrical connectors, the medium comprises: (1) a base oil formed of a liquid polymeric ester of an alkylene glycol and an aliphatic dicarboxylic acid, the polymeric ester having a molecular weight in the range of from about 400 to about 1500, the ester being capped by a monohydric alcohol or a monocarboxylic acid, (2) a gelling, or thickening, agent and (3) a stabilizer combination including (a) an aromatic amine antioxidant, (b) a hindered phenol antioxidant, (c) a metal corrosion inhibitor and (d) a rust inhibitor.

---

A gelled fluid metal corrosion protection medium is generally required for connectors, or junction points, for outdoor electric power cables. Electric power cables are exposed to a wide range of atmospheric conditions ranging from severe cold to relatively high temperature, i.e. in the tropics, the abrasive effect of wind, water and in coastal areas the possibility of salt water corrosion. An additional problem, which is especially prevalent in the coastal areas of North America is galvanic corrosion occurring at the junction point between cables formed of two different metal conductors.

Specifically, power cables utilized along the coasts are often copper; power cables utilized throughout the rest of the continent are often aluminum. Thus, where the inland cables join the coastal system, two dissimilar metals are joined. At the points of contact between these two dissimilar conducting systems, a very serious galvanic corrosion problem is created. This is especially acute when the contact is between two metals having widely differing galvanic potentials, and the cables are in one of the usually damp regions of the United States.

Accordingly, the industry had to utilize a material which would protect the two dissimilar metals at their point of contact to prevent galvanic corrosion. The most immediate need was for a material that would effectively exclude water, or any aqueous material, from contacting the metals at their point of contact and which would not itself sustain a galvanic current.

Originally petroleum greases were utilized for this purpose. Other grease-like materials which had found limited use were prepared from oils of the so-called synthetic lubricants, for example a castor oil-polyalkylene glycol blend. These materials however tended to be removed by water rather quickly, and therefore had to be frequently replaced. The petroleum greases also failed to completely wet the metals and manifested physical and chemical instability under the rather extreme conditions of temperature and chemical attack to which electrical connectors are exposed.

The metal corrosion protection medium must be readily packed into the electrical connector, must remain flexible at the sub-zero temperatures of northern winters, yet must not bleed or run out at the relatively high temperatures i.e. 300° F. or higher, to which these electrical connectors are often heated by the energy created by the electrical resistance of the conductors. A suitable material for use as a galvanic corrosion protector for electrical conductors must also be capable of completely wetting the conductor metals, preferably being adherent thereto, but must also be hydrophobic so as not to be readily washed away by the action of water. The composition should itself be inert to the metal.

Finally, the corrosion protection medium must not attack the protective rubber gloves generally worn by electrical linemen, which would be exposed to any medium which may adhere to a connector cable or which may be forced out when the cable is pushed into the packed connector.

An almost ideal material has now been discovered which is useful at both the low and high temperature ranges to which an electrical conductor is exposed; the material is stable under such conditions, extremely effective as a wetting agent for the metal conductors, hydrolytically very stable and in addition does not attack linemen's gloves and is adherent to the metals of the conductors.

In accordance with this invention, a hydrolysis-resistant, wide-temperature range, synthetic medium especially designed and adapted for use as a corrosion protector for electrical connectors is provided which comprises (1) a liquid polymeric ester of an alkylene glycol and an aliphatic dicarboxylic acid, terminated by a monohydric alcohol or monocarboxylic acid, and having a molecular weight in the range of from about 400 to about 1500, (2) a gelling, or thickening, agent, and (3) a stabilizer additive combination comprising a rust inhibitor, a hindered phenol antioxidant and an amine antioxidant, and a metal corrosion inhibitor. The stabilizer combination generally includes at least one compound falling into each of the above-listed categories.

The alkylene glycols from which the preferred synthetic polymeric ester lubricant is derived have the formula HO—R'—(OR')$_x$—OH, wherein R' can be an alkylene group, and should contain from about two to about six carbon atoms, and preferably from three to four carbon atoms and the sum of the carbon atoms in all of the R' groups should not be greater than about 20, and preferably about 6, and $x$ can be zero or an integer from one to about four. R' can be straight or branched chain alkylene groups and includes preferably 1,2-propylene, 1,3-propylene, 1,2-butylene, 1,3-butylene, 1,4-butylene, 2,3-butylene, 1,5-amylene, 2-ethyl-1,4-butylene, and hexamethylene. The preferred glycols include 1,3-propylene glycol, di-1,2-propylene glycol, 1,2-butylene glycol, 1,3-butylene glycol and 1,4-butylene glycol.

The aliphatic dicarboxylic acids from which the preferred synthetic polymeric ester lubricant is derived have the general formula HOOC—R$^2$—COOH wherein R$^2$ is an alkylene group containing from about three to about twelve carbon atoms.

Preferably the R$^2$ groups are straight chain alkylene groups such as propylene, butylene, amylene, hexamethylene, heptamethylene and octamethylene. Generally, the esters of the straight chain acids have been found to have a greater viscosity index than the branch chain acids. Suitable dicarboxylic acids for use in the present invention include preferably those saturated aliphatic dibasic acids containing from about six to about ten carbon atoms and include, for example, succinic acid, glutaric acid, adipic acid, pimelic acid, suberic acid and azelaic acid.

The monocarboxylic acid groups which can be utilized as the terminal, or capping, members for the polymeric ester have the formula R$^3$—COO, wherein R$^3$ is an alkyl group, having from about 4 to about 24 carbon atoms and preferably containing from about 6 to about 18 carbon atoms. The preferred monocarboxylic acids include caproic acid, pelargonic acid, valeric acid, 2-ethylhexanoic acid, lauric acid, tridecylic acid, palmitic acid, myristic acid, and stearic acid.

The monohydric alcohol groups which can be utilized as the terminal, or capping, members have the formula $R^4$—O, wherein $R^4$ is an alkyl group containing from about four to about eighteen carbon atoms and preferably from about eight to about fourteen. Such alcohols are commonly available as prepared by the "oxo" process. The alcohols are preferably branched chain and the commercially available products can be identified as iso-octyl alcohol, a mixture of branched-chain, eight carbon atom alcohols prepared by the oxo process, isodecyl alcohol, (a mixture of $C_{10}$ oxo alcohols), 2-ethylhexanol and isonoyl alcohol, isotridecyl alcohol, (a mixture of $C_{13}$ "oxo" alcohols), etc.

The complex esters useful according to the present invention, in an electrical connector corrosion protection medium, can be prepared by any number of conventional ways. For example, a useful method is disclosed in the text *Synthetic Lubricants,* by Gunderson and Hart, Rheinhold Publishing Corp., (New York, 1962), see especially pages 151 to 153.

It is conventional in preparing these polyesters to determine the terminal or capping groups based upon the stoichiometric proportions of polyol and acid present. An excess of polyacid requires an alcohol terminating agent; an excess of polyol requires an acid terminating agent.

The complex polymeric esters of the present invention, where alcohol-capped, can be generally defined by the following formula:

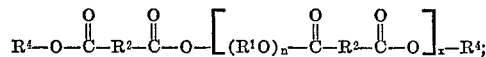

where the capping members are acid derived, by the general formula:

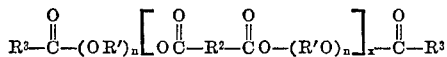

where the various R groups are as defined, above, $x$ is equal to from 2 to about 19 and preferably from about 4 to about 12 and $n$ is equal to from 1 to about 4.

The acid number of the above complex polymeric esters can be in the range of from zero to about four and the hydroxyl number in the range of from zero to about twenty. Although optimally the acid number is zero, it can most usefully be as high as about 2.5 without substantially affecting the noncorrosive quality of the ester.

The effect on the viscosity and viscosity index of polymeric esters, by varying the degree of branching of the alcohol groups and molecular weight of the polymeric ester is well known, and discussed for example in the text *"Synthetic Lubricants,"* supra.

Accordingly, a preferred method of defining the preferred molecular weight and structure of the polymeric ester useful in the present invention is based upon the physical i.e. fluid, properties of the material. The polymeric esters preferred for use in the present invention should have a viscosity at 210° F. in the range of from about 10 to about 50 cst. and optimally from 15 to about 50, a viscosity at 100° F. in the range of from about 150 to about 450 and optimally from about 160 to about 420; a viscosity index on the Dean and Davis scale of preferably above about 100, a pour point of not higher than about minus (—) 15° F. and optimally not higher than minus (—) 20° F. and a flash point of at least about 400° F.

The term "viscosity index," refers to the change of viscosity with temperature of a lubricant and is measured by standard tests. Specifically, viscosity, as used herein is determined in accordance with the procedure of ASTM D 445 and the viscosity index as used herein is determined according to the procedure of ASTM D 2270.

The molecular weight of the polymeric ester is determined by vapor pressure osmometry by the method described in the *Mechrolab Vapor Presusre Osmometer, Model 301 Instruction Manual,* Code Number C1M.2.

The liquid polymeric ester can be mixed with a conventional gelling, or thickening, agent to form the solid or semi-solid gel material. Preferred thickening agents, for example the lithium, calcium and aluminum salts of hydroxy aliphatic monocarboxylic acids and of fatty acids, preferably saturated acids, and calcium-aluminum-ammonium complex salts. Preferably, salts of such monocarboxylic acids containing from about 10 to about 30 carbon atoms should be used. Alternate thickeners include silica, bentonite clays or other finely divided, particulate inorganic materials. These materials are conventional in the manufacture of lubricating greases.

Generally, the thickening agent must be suitable for the intended purpose and compatible with the polymeric ester. Examples of preferred thickening agents include lithium 12-hydroxy-stearate, calcium hydroxystearate, lithium stearate, aluminum stearate, aluminum hydroxy stearate.

The gelling agent is added in a conventional amount sufficient to form a thickened grease, generally in proportions of from about 4 to about 20 percent by weight of the total composition and preferably from about 10 to about 14 percent by weight.

In addition there can also be usefully present an abrasive, such as a powdered metal, e.g. nickel or zinc. The total level of the thickener used is in part dependent upon the amount of, and the method of mixing, the abrasive and the low temperature workability required.

The above gelled oil is stabilized by a multi-component stabilizer system comprising a hindered phenol anitoxidant and a secondary amine or tertiary amine antioxidant and two types of metal corrosion inhibitors: a rust inhibitor. i.e. to limit the corrosion of ferrous metals, and a second type of corrosion inhibitor which is usually considered specific against the corrosion of copper or copper-containing alloys. The hindered phenol antioxidant can be present in amounts of from about 0.2 to about 2.5% by weight of the total gelled composition and preferably from about 0.5 to about 1.5 percent by weight. The secondary amine antioxidant can be present in an amount of from about 0.5 to about 2.5% by weight of total composition and preferably from about 1.0 to about 2.0%. The corrosion inhibitor can be present in amounts of from about 1.0 to about 4.0% by weight of total composition and preferably from about 2 to about 3% by weight. The rust inhibitor can be present in an amount of from about 1.0 to about 3.0% by weight of the total composition and preferably from about 1.5 to about 2.5% by weight. The remainder of the gelled composition is comprised of the polymeric ester and the thickening agent. Each type of stabilizer additive can be present as a single compound, or a mixture of compounds. Alternatively, one compound can have the combined effectiveness of both of two different types, see for example, aminophenols and hydroxyphenyl amine compounds.

It has been found that the above combination of additives is preferred for obtaining a fully stable and effective electrical connector corrosion preventing medium.

The term "hindered phenol" defines a well-known class of orthosubstituted phenol antioxidants, where the combined bulk of all substituents ortho to the hydroxyl is sufficient to substantially completely block the hydroxyl group by steric hindrance. This can be accomplished by a single extremely bulky group, or by two somewhat less bulky groups. Generally, a single ortho substituent having a tertiary carbon atom directly linked to the aromatic ring is sufficient. Alternatively, two ortho substituents containing a total of at least five carbon atoms would be sufficient to "hinder" the phenolic hydroxyl group.

The hindered phenol can generally be defined by the formula:

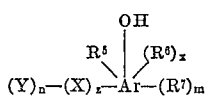

wherein Ar is a carbocyclic aromatic group, preferably phenyl or naphthyl, although compounds containing the higher polycarbocyclic aromatic groups, such as anthracyl can be used if available.

The preferred phenyl and naphthyl compounds can have the formulae, respectively,

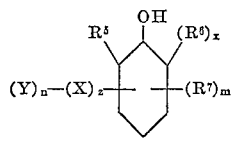

or

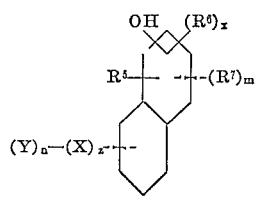

wherein the aromatic ring drawn can be either phenyl or naphthyl, substituted in either or both of the positions ortho to the hydroxyl group; the $R^5$, $R^6$ and $R^7$ groups are hydrocarbon or inertly substituted such groups which are connected to the aromatic ring, the $R^5$ and $R^6$ groups are connected ortho to the hydroxyl group, x can be zero or one; when x is zero, $R^5$ must be a group at least as bulky as a tert. butyl group; when x is one, $R^5$ and $R^6$ must each contain at least one carbon atom, and the sum of $R^5$ and $R^6$ must be at least five carbon atoms; m can be zero or an integer from 1 to 3; z can be zero or an integer, preferably 1 to 3; Y can be a second hindered hydroxyaryl ring identical to or different from that shown in the formulae connected through X to the aromatic ring shown; X can be a direct carbon-to-carbon bond between the aromatic rings, but preferably is a linking group such as an oxygen atom, sulfur atom, or a di- or polyfunctional, saturated aliphatic or aromatic hydrocarbon group, ester or ether group or other inert di- or polyfunctional group; n is the number of hydroxyaryl Y groups, and can be zero or an integer from 1 to about 4; if z is a di-functional group, z will equal n; generally $$z = \frac{n}{(\text{functionality of } X - 1)}$$

In the above formulae, $(Y)_n - (X)_z$ can be attached ortho to the hydroxyl groups, thus forming a hindering group. In the condensed napththyl ring, the hydroxyl group can be at the 1 or 4 positions and thus only a single ortho substituent can be present containing at least three carbon atoms.

The $R^5$, and $R^6$ and $R^7$ groups are preferably aliphatic or cycloaliphatic groups and optimally are saturated, so that they are stable in the lubricating composition. When $R^5$, $R^6$ or $R^7$ are alkyl or cycloalkyl groups, they preferably contain from 1 to about 6 carbon atoms. R can also be other inert groups such as ester groups or oxyalkyl or oxycycloalkyl groups, but can also include an amino group. X can be a divalent group such as an alkylene group, cycloalkylene group, alkarylene group or aralkylene group having from about 1 to about 10 carbon atoms, such as methylene, ethylene, propylene and butylene groups. Polyfunctional groups include polyfunctional ester-containing groups, or polyfunctional aromatic groups, such as 1,3,5-trimethyl-benzene having free linkages in the 2, 4 and 6 positions.

The most readily commercially available hindered phenols are the monocyclic phenols and the bisphenols. Examples of the preferred hindered phenol antioxidants include 4,4'-methylene bis(2,6-di-t-butyl phenol), 2,6-di-t-butyl paracresol, 2,6-di-t-butyl-4-benzyl phenol, 3-t-butyl-tetrahydro-2-naphthol, diphenylol propane, 2,2'-methylene bis (4-ethyl-6-t-butyl phenol), 4,4'-methylene bis (6-t-butyl-5-indanol), 2,2'-methylene bis(4-methyl-6-t-butyl phenol), 2,2' - ethylene bis(4 - ethyl - 6 - t-butyl phenol), 1,3,5 - trimethyl-2,4-6-tris(3,5-di-t-butyl-4 - hydroxylbenzyl) benzene, 2,6-di-t-butyl-α-dimethyl amino-p-cresol and 2,6-di-t-butyl-α-diphenylamine-p-cresol.

The amine antioxidants useful in the present invention are also a well-known group of compounds. Generally the antioxidants useful herein preferably contain at least a secondary substitution, i.e. are preferably secondary or tertiary amines, and even more preferably are aromatic secondary or tertiary amines, optimally wherein at least two aromatic groups are connected to an amino nitrogen atom. The general formula for the preferred compound is:

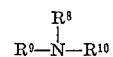

wherein $R^9$ and $R^{10}$ are selected from alkyl and cycloalkyl groups containing up to about eight carbon atoms, aryl, aralkyl and alkaryl groups, wherein at least one and optimally both include an aromatic ring, i.e. aryl, alkaryl or aralkyl, and $R^8$ is a hydrogen atom or a saturated or aromatically unsaturated hydrocarbon group containing up to about 26 carbon atoms. Any of $R^8$, $R^9$ and $R^{10}$ can also be substituted with one or more additional amine groups to form a di- or polyamine. $R^9$ and $R^{10}$ can be linked to form a ring structure including the nitrogen atom; such as in the thiazoles. Additionally, an aromatic group can be hydroxy-substituted to form hindered phenol groups. Thus $R^9$ and $R^{10}$ can be for example, phenyl, naphthyl, alkyl-substituted phenyl and alkyl-substituted napthyl, the alkyl groups having from 1 to about 20 carbon atoms and preferably one to ten, or a thio-linked diphenyl having the formula:

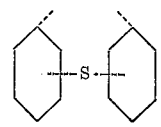

Examples of such amine antioxidants include phenyl alpha-naphthyl amine, dioctyldiphenylamine, phenothiazine, N-methyl phenothiazine, phenyl beta-naphthyl-amine, p-phenylene diamine, o-phenylene diamine, 2,4'-diamino diphenylamine, alpha,beta - di - naphthylamine, 3,7-di-octyl phenothiazine, para, para'-dioctyldiphenylamine, dimethyloctadecylamine and 2.6-di-t-butyl - α - diphenylamino-p-cresol.

The most preferred examples of the hindered phenols and the aromatic amine antioxidants are set forth in the examples below.

As indicated above, a single compound can contain a substituted amino function and a hindered phenol function. Such compounds can often substitute for the two different compounds.

The metal corrosion inhibitors which are especially useful in the present invention are prepared from the monocarboxylates of 1-salicylalaminoguanidine. The carboxylate portion can be derived from a saturated or unsaturated aliphatic acid, preferably having from about 6 to about 30 but optimally from about 12 to about 20 carbon atoms. Such materials are often readily obtainable from natural vegetable and animal fats and oils and include materials such as maleic acid, palmitic acid, oleic acid, stearic acid, linoleic acid, margaric acid, myristic acid, and pentadecylic acid. Mixtures of various acids, including natural mixtures, such as the tallow fatty acids, palm oil, olive oil, cottonseed oil, linseed oil, soybean oil, ung oil and butterfat. These carboxylate salts are commercially available and are sold for example by DuPont under the trademark DMS which consists substantially of the monocarboxylate in solution, or as Ortholeum 300, which is a blend of one of the above monocarboxylates plus a diphenylamine. For a further description of these compounds see U.S. Pats. Nos. 2,584,784 and 2,580,881.

Less preferred metal corrosion inhibitiors which can also be present include benzotriazole; alkyl gallates, especially propyl gallate; a phenyl ring-substituted benzotriazole; an anthranilamide type compound as described in U.S. Pat. No. 3,585,137; the proprietary product known as Amoco 150, which has the general formula:

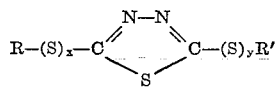

wherein the R groups are alkyl groups having from 4 to 12 carbon atoms and $x$ and $y$ are equal to from 1 to about 4; various salicyl-amino compounds, such as disalicylidene-1, 2-diaminopropane.

A special type of a corrosion inhibitor which must be also present in the present formulation is a so-called "rust" inhibitor, an inhibitor which is effective specifically in preventing corrosion of the ferrous metals. A preferred type of such rust inhibitors includes, for example, partial fatty acid esters of sorbitan, especially the monoester with an unsaturated acid having from 8 to 24 carbon atoms. Such compounds include sorbitan monooleate, sorbitan monoricinoleate, sorbitan monolinoleate, and sorbitan monoerusate.

Other known types of rust inhibitors which may be used in the present invention include the neutral and basic alkali and alkaline earth metal sulfonates. These rust inhibitors are known compounds, well known to the art and are further disclosed for example in R.T. Vanderbilt Bulletin No. 701, "Petroleum Additives."

In utilizing the protective medium of the present invention, an electrical connector is filled with the gelled fluid material prepared in accordance with the present invention. An electrical connector can be generally described as a means for electrically connecting two or more electric power cables or one or more cables to a terminal, and includes, for example, the tap, splice and bolt-on types. These connectors are conventionally used and well-known to workers in the electrical power field, thus forming no part of the present invention.

The gelled fluid-packed electrical connector is then packaged and shipped to its point of use; usually the use is by a lineman at remote power line pylons. The gelled fluid, as pointed out above, must be sufficiently fluid at any temperature to which it may be exposed such that when an electrical conductor wire is pushed into the connector it can readily pass into the medium and the medium will flow around the wire, wetting the metal conductor and substantially sealing it from any corrosive material, i.e. rain, salt spray, etc. The electrical connector will generally be provided with at least two openings for the insertion of at least two electrical cables, as pointed out above.

During the packing of the electrical connector, the handling properties of the gelled fluid become critical. The material should be sufficiently fluid to be readily packed into the connector, but be sufficiently gelled so as to not flow out of the connector during storage, or more critically after connection to the power cables when it may be subjected to relatively high temperatures. It further must have a high wetting function towards metal, but it must be not overly tacky when being handled during the packing of the connector.

An especially crucial problem found when using esters is reactivity or dissolving power towards the synthetic and natural rubbers from which electrical linemen's gloves are commonly made. There is a standard test (ASTM D471) for sensitivity to linemen's rubber equipment (described in ASTM D 120).

The following examples describe preferred embodiments of the present inventions. They are intended to be merely exemplary and do not exclusively define the scope of the present invention.

EXAMPLE 1

An ester polymer base oil is provided prepared from 1,2-propylene glycol and adipic acid, capped by isodecanoic acid. The ester has a molecular weight of about 600, a pour point of approximately −20° F., a viscosity at 100° F. of 186 cst., a viscosity at 210° F. of 18 and a viscosity index on the Dean and Davis scale of 115. The ester polymer was mixed in a conventional mixing kettle in the following stabilizer additive formulation.

| Ingredients: | Parts by weight |
| --- | --- |
| 1,2-Propylene glycol adipate ester | 81.0 |
| Sorbitan Monooleate | 2.0 |
| 4,4′-Methylenebis (2,6-di-tert. butyl-phenol) | 1.0 |
| Phenothiazine | 1.0 |
| Phenyl alpha-naphthylamine | 0.5 |
| Ortholeum 300 [a] | 1.0 |
| Propyl Gallate | 0.5 |
| Benzotriazole | 0.5 |
| DMS [b] | 0.5 |

[a] Ortholeum 300 is a mixture of diphenyl amine and 1-salicylalaminoguanidine monooleate.
[b] DMS is 1-salicylalaminoguanidine monocarboxylate.

To the stabilized oil, heated to 180° F. is added 12 parts by weight of lithium 12-hydroxystearate, the mixture is then blended using a lightening mixer. The blend is heated to about 380–400° F. (the melting point of the soap) and then suddenly cooled by pouring the blend into chilled metal trays, where the blend gels as a result of the sudden cooling.

The above gelled formulation was then packed into a bolt-on type connector. The material was found to be readily packed, did not flow out of the connector even at temperatures of 300° F. and was not too tacky to be worked with during packing. Further the material had a minimal effect on linemen's gloves.

In tests of the packed connector in the field, the material was found to provide protection against corrosion when utilized for a copper-aluminum electrical cable connection for a period several times longer than that provided by a conventional petroleum-based grease-packed connector.

EXAMPLE 2

A portion of the composition of Example 1 (60 parts by weight) was mixed with 40 parts by weight of powdered nickel. The same improvement was noted in a tap-type connector and in a splice-type connector used to join two aluminum cables with regard to the period of corrosion resistance provided by the composition of the present invention when compared to conventional petroleum-based protective agents.

EXAMPLE 3

A portion of the composition of Example 1 (60 parts by weight) was mixed with 40 parts by weight of powdered zinc. The same improvement was noted in a tap-type connector and in a splice-type connector used to join two aluminum cables with regard to the period of corrosion resistance provided by the composition of the present invention when compared to conventional petroleum-based protective agents.

EXAMPLE 4

The procedure of Example 1 was repeated but substituting 1,3-butylene glycol adipate capped by isodecanol for the propylene glycol adipate. The ester had a molecular weight of 1200, a pour point of −15° F, a viscosity at 100° F. of 408 cst., at 210° F. of 42 cst., and a viscosity index on the Dean and Davis scale of 164. The same improvement was noted in a tap-type connector and in a splice-type connector used to join two aluminum cables with regard to the period of corrosion resistance provided by the composition of the present invention when compared to conventional petroleum-based protective agents.

EXAMPLE 5

The procedure of Example 1 was repeated but substituting 1,3-butylene glycol adipate capped by pelargonic acid for the propylene glycol adipate. The same improvement was noted in a tap-type connector and in a splice-type connector used to join two aluminum cables with regard to the period of corrosion resistance provided by the composition of the present invention when compared to conventional petroleum-based protective agents.

EXAMPLE 6

The procedure of Example 1 was repeated but substituting 1,5 amylene glycol succinate, capped by isononyl alcohol for the propylene glycol adipate. The same improvement was noted in a tap-type connector and in a splice-type connector used to join two aluminum cables with regard to the period of corrosion resistance provided by the composition of the present invention when compared to conventional petroleum-based protective agents.

EXAMPLE 7

The procedure of Example 1 was repeated but substituting diethylene glycol succinate capped by 2-ethylhexoic acid for the propylene glycol adipate. The same improvement was noted in a tap-type connector and in a splice-type connector used to join two aluminum cables with regard to the period of corrosion resistance provided by the composition of the present invention when compared to conventional petroleum based protective agents.

The patentable embodiments of this invention which are claimed are as follows:

1. A gelled synthetic oil corrosion protection composition for use in electrical power cable connectors that consists essentially of
   (a) a base oil that is a polymeric ester having a molecular weight of about 400 to 1500, said polymeric or the structural formula

or the structural formula

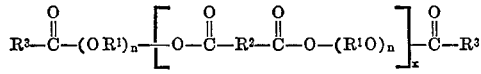

wherein
   each $R^1$ is an alkylene group having 2 to 6 carbon atoms, the sum of the carbon atoms in all of the $R^1$ groups being not greater than 20;
   each $R^2$ is an alkylene group having 3 to 12 carbon atoms;
   each $R^3$ is an alkyl group having 4 to 24 carbon atoms;
   each $R^4$ is an alkyl group having 4 to 18 carbon atoms;
   each $x$ is a number in the range of 2 to 19; and
   each $n$ is a number in the range of 1 to 4;
   (b) 4 to 20 percent of a gelling agent selected from the group consisting of
   (i) lithium, calcium, and aluminum salts of saturated aliphatic monocarboxylic acids having 10 to 30 carbon atoms,
   (ii) lithium, calcium, and aluminum salts of hydroxystearic acid,
   (iii) finely-divided silica,
   (iv) finely-divided bentonite, and
   (v) mixtures thereof;
   (c) 0.2 to 2.5 percent of a hindered phenol having the structural formula

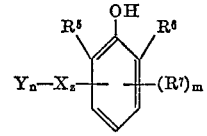

wherein $R^5$, $R^6$, and $R^7$ represent alkyl groups having 1 to 6 carbon atoms, X represents an alkylene group having 1 to 10 carbon atoms, Y represents a second hindered hydroxylaryl ring that is the same as or different from that attached to X in the foregoing structural formula, $z$ is a number in the range of 0 to 3, $m$ is a number in the range of 0 to 3, and $n$ is a number in the range of 0 to 4;
   (d) 0.5 to 2.5 percent of an amine having the structural formula

wherein $R^8$ represents hydrogen or an aromatic hydrocarbon group having 6 to 26 carbon atoms, and $R^9$ and $R^{10}$ represent alkyl or cycloalkyl groups having 1 to 8 carbon atoms;
   (e) 1.0 to 4.0 percent of a corrosion inhibitor selected from the group consisting of salicylalaminoguanidine salts with aliphatic monocarboxylic acids having 6 to 30 carbon atoms, benzotriazole, propyl gallate, disalicylidene-1,2-diaminopropane, and mixtures thereof; and
   (f) 1.0 to 3.0 percent of a rust inhibitor selected from the group consisting of sorbitan esters of unsaturated fatty acids having 8 to 24 carbon atoms, alkali metal and alkaline earth metal sulfonates, and mixtures thereof,
all prcentages being percentages by weight based on the weight of the composition.

2. A gelled synthetic oil corrosion protection composition as defined in Claim 1 that consists essentially of
   (a) said base oil,
   (b) 10 to 14 percent of said gelling agent,
   (c) 0.5 to 1.5 percent of said hindered phenol,
   (d) 1.0 to 2.0 percent of said amine,
   (e) 2.0 to 3.0 percent of said corrosion inhibitor, and
   (f) 1.5 to 2.5 percent of said rust inhibitor.

3. A gelled synthetic oil corrosion protection composition as defined in Claim 1 wherein the base oil is an acid-terminated polyester having the structural formula

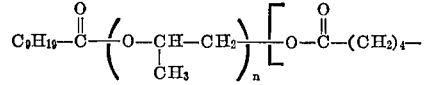
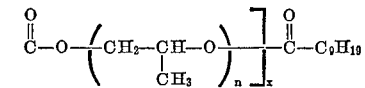

wherein $n$ and $x$ have the aforementioned significance.

4. A gelled synthetic oil corrosion protection composition as defined in Claim 1 wherein the base oil is an alcohol-terminated polyester having the structural formula

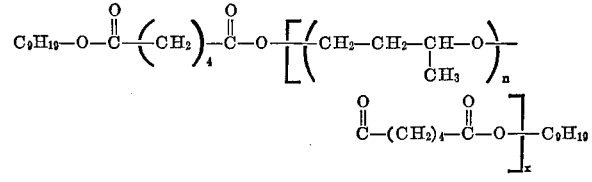

wherein $n$ and $x$ have the aforementioned significance.

5. A gelled synthetic corrosion protection composition as defined in Claim 1 that consists essentially of
   (a) said base oil,
   (b) 10 to 14 percent of lithium 12-hydroxystearate, (c) 0.5 to 1.5 percent of 4,4'-methylene bis(2,6-di-tert.butyl phenol), (d) 0.5 to 25 percent of an amine component consisting of phenothiazine and phenyl alpha-naphthylamine, (e) 1.0 to 4.0 percent of a corrosion inhibitor component consisting of salicylalaminoguanidine monooleate, benzotriazole, and propyl gallate, and (f) 1.0 to 3.0 percent of sorbitan monooleate.

6. A process for preventing the corrosion of two metal cables at their point of junction that comprises applying to the metal cables at their point of junction the gelled synthetic oil corrosion protection composition of Claim 1.

7. A packed electrical power cable connector comprising a connector body and packed within the connector body the gelled synthetic oil corrosion protection composition of Claim 1.

References Cited
UNITED STATES PATENTS 3,687,609  8/1972  Gogarty et al. _____ 21—2.5 R
3,692,675  9/1972  Nimerick _____ 21—2.5 R BENJAMIN R. PADGETT, Primary Examiner I. GLUCK, Assistant Examiner U.S. Cl. X.R.

21—2.5 R, 2.7 R; 208—47; 252—56 S, 392, 393, 403, 404